US012149393B2

(12) United States Patent
Xin et al.

(10) Patent No.: US 12,149,393 B2
(45) Date of Patent: Nov. 19, 2024

(54) TIME-DOMAIN MODULATION SCHEME FOR LOW PEAK AVERAGE POWER RATIO

(71) Applicant: ZTE Corporation, Guangdong (CN)

(72) Inventors: Yu Xin, Guangdong (CN); Jun Xu, Guangdong (CN); Guanghui Yu, Guangdong (CN); Jian Hua, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/838,060

(22) Filed: Jun. 10, 2022

(65) Prior Publication Data

US 2022/0385513 A1 Dec. 1, 2022

Related U.S. Application Data

(63) Continuation of application No. PCT/CN2019/125218, filed on Dec. 13, 2019.

(51) Int. Cl.
*H04L 27/26* (2006.01)
*H04L 27/34* (2006.01)
*H04W 52/02* (2009.01)

(52) U.S. Cl.
CPC ...... *H04L 27/2614* (2013.01); *H04L 27/2627* (2013.01); *H04L 27/3411* (2013.01); *H04W 52/0219* (2013.01)

(58) Field of Classification Search
CPC ............. H04L 27/2614; H04L 27/2626; H04L 27/2627; H04L 27/20; H04L 27/22;
(Continued)

(56) References Cited

U.S. PATENT DOCUMENTS 5,805,640 A * 9/1998 O'Dea ................. H04L 27/2053
375/296
7,792,200 B2 9/2010 Molander
(Continued)

FOREIGN PATENT DOCUMENTS

CN 1972265 A 5/2007
CN 101305576 A 11/2008
(Continued)

OTHER PUBLICATIONS

International Search Report and Written Opinion mailed on Aug. 25, 2020 for International Application No. PCT/CN2019/125218, filed on Dec. 13, 2019 (7 pages).
(Continued)

*Primary Examiner* — Betsy Deppe
(74) *Attorney, Agent, or Firm* — Perkins Coie LLP

(57) ABSTRACT

Methods, apparatus, and systems for reducing Peak Average Power Ratio (PAPR) in signal transmissions are described. In one example aspect, a wireless communication method includes determining, for an input sequence, an output sequence. The output sequence corresponds to an output of a convolutional modulation between a set of coefficients and an intermediate sequence. The intermediate sequence is generated by inserting N zero coefficients between coefficients of the input sequence. The number of non-zero coefficients in the set of coefficients is based on N, N being a positive integer. Values of the non-zero coefficients correspond to values between 0 to $\pi/2$ to reduce a peak to average power ratio of the output sequence. The method also includes generating a waveform using the output sequence.

18 Claims, 5 Drawing Sheets

(58) Field of Classification Search
CPC ......... H04L 27/18; H04L 27/36; H04L 27/38; H04L 27/34; H04L 27/3411; H04W 52/0219
See application file for complete search history.

(56) References Cited

U.S. PATENT DOCUMENTS

| | | | |
|---|---|---|---|
| 8,432,996 B2* | 4/2013 | Watanabe | H04L 27/2626 375/295 |
| 8,792,572 B1 | 7/2014 | McGowan et al. | |
| 8,867,469 B2 | 10/2014 | Han et al. | |
| 9,083,593 B2* | 7/2015 | Xin | H04L 27/2666 |
| 11,962,451 B2 | 4/2024 | Xin et al. | |
| 2002/0064234 A1 | 5/2002 | Kaku et al. | |
| 2004/0086054 A1 | 5/2004 | Corral | |
| 2011/0075756 A1 | 3/2011 | Watanabe | |
| 2011/0258244 A1 | 10/2011 | Kang | |
| 2013/0198590 A1 | 8/2013 | Kim et al. | |
| 2016/0043888 A1 | 2/2016 | Tao et al. | |
| 2016/0254889 A1 | 9/2016 | Shattil | |
| 2017/0019282 A1 | 1/2017 | Madaiah et al. | |
| 2019/0052486 A1* | 2/2019 | Kuchi | H04L 27/2614 |

FOREIGN PATENT DOCUMENTS

| | | |
|---|---|---|
| CN | 102325118 A | 1/2012 |
| CN | 103237000 A | 8/2013 |
| CN | 103780538 A | 5/2014 |
| CN | 104396205 A | 3/2015 |
| CN | 104836641 A | 8/2015 |
| CN | 105072072 A | 11/2015 |
| CN | 105681241 A | 6/2016 |
| CN | 108270713 A | 7/2018 |
| CN | 114651428 A | 6/2022 |
| EP | 2659638 A1 | 11/2013 |
| EP | 3496368 A1 | 6/2019 |
| EP | 4026284 A1 | 7/2022 |
| JP | 2002-164801 A | 6/2002 |
| JP | 2007-325072 A | 12/2007 |
| JP | 2011-071855 A | 4/2011 |
| KR | 20100064665 A | 6/2010 |
| WO | 2007020943 A1 | 2/2007 |
| WO | 2008152596 A2 | 12/2008 |
| WO | 2012115618 A1 | 8/2012 |
| WO | 2021042320 A1 | 3/2021 |

OTHER PUBLICATIONS

ZTE, "Remaining issues on low PAPR RS," 3GPP TSG RAN WG1 Meeting #96bis, Xi'an, China, R1-1904016, 11 pages, Apr. 8-12, 2019.

ZTE, "Discussion on Low PAPR RS," 3GPP TSG RAN WG1 Meeting #95, Spokane, USA, R1-1812259, 12 pages, Nov. 12-16, 2018.

Samsung, "Low PAPR modulation and waveform," y3GPP TSG RAN WG1 Meeting #87, Reno, USA, R1-1612559, 4 pages, Nov. 14-18, 2016.

European Search Report issued in EP Patent Application No. 19952160.0, dated Jun. 28, 2023, 10 pages.

Japanese office action issued in JP Patent Application No. 2022-535863, dated Sep. 27, 2023, 9 pages. English translation included.

Canadian notice of allowance issued in CA Patent Application No. 3,164,466, dated Sep. 28, 2023, 1 page.

Indonesian office action issued in ID Patent Application No. P00202207449, dated Mar. 25, 2024, 4 pages. English translation included.

Japanese notice of allowance issued in JP Patent Application No. 2022-535863, dated Mar. 25, 2024, 3 pages. English translation included.

Chinese office action issued in CN Patent Application No. 201980102651.2, dated Apr. 3, 2024, 40 pages. English translation included.

Iith et al., "Low PAPR Reference Signals," 3GPP TSG RAN WG1 Meeting #96bis, R1-1903897, Xian, China, Apr. 8-12, 2019, 8 pages.

Korean office action issued in KR Patent Application No. 10-2022-7023847, dated Jun. 25, 2024, 8 pages. English translation included.

Indonesian office action issued in ID Patent Application No. P00202207449, dated Jul. 19, 2024, 4 pages. English translation included.

Chinese office action issued in CN Patent Application No. 201980102651.2, dated Aug. 30, 2024, 18 pages. English translation included.

\* cited by examiner

US 12,149,393 B2

TIME-DOMAIN MODULATION SCHEME FOR LOW PEAK AVERAGE POWER RATIO

CROSS-REFERENCE TO RELATED APPLICATIONS

This application is a continuation of International Patent Application No. PCT/CN2019/125218, filed on Dec. 13, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for reducing Peak Average Power Ratio (PAPR) in signal transmissions.

In one example aspect, a wireless communication method includes determining, for an input sequence, an output sequence. The output sequence corresponds to an output of a convolutional modulation between a set of coefficients and an intermediate sequence. The intermediate sequence is generated by inserting N zero coefficients between coefficients of the input sequence. The number of non-zero coefficients in the set of coefficients is based on N, N being a positive integer. Values of the non-zero coefficients correspond to values between 0 to $\pi/2$. The method also includes generating a waveform using the output sequence.

In another example aspect, a wireless communication method includes receiving a sequence generated based on an output of a convolutional modulation between a set of coefficients and an intermediate sequence. The intermediate sequence is generated by inserting N zero coefficients between coefficients of an input sequence. The number of non-zero coefficients in the set of coefficients is based on N, N being a positive integer. Values of the non-zero coefficients correspond to values between 0 to $\pi/2$. The method also includes demodulating the sequence to determine the input sequence.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

In high-frequency wireless communication scenarios, path loss and shadow attenuation are relatively large. Thus, the signal-to-noise ratio in some areas at the edge of the cell is low. Moreover, the efficiency of the power amplifier (PA) is relatively low at high frequencies. To improve the signal to interference and noise ratio (SINR) and also save power consumption of the User Equipment (UE), it is desirable to have the UE transmit signals at the lower Peak Average Power Ratio (PAPR).

Furthermore, terminal devices may want to greatly reduce power consumption in the case of massive Machine Type Communication (mMTC). For example, in some scenarios, it is desirable to have a long battery life (e.g., of more than ten years) to reduce the need of dispatching maintenance team to replace batteries. To improve the PA efficiency of such terminal devices, the transmitted signals should be with the lower PAPR. In particular, when a large number of user devices gain non-orthogonal access, the SINR is very low. There exists a need to use a low modulation and coding scheme (MCS) and low PAPR signal modulation to improve the transmission quality.

In the current Fifth-Generation (5G) New Radio (NR) standard, although the peak-to-average ratio of DFT-s-OFDM signals is relatively low, it is still difficult to meet low PAPR requirements of various application scenarios of B5G or 6G. This patent document describes techniques that can be implemented in various embodiments to use a modulation scheme that further reduces PAPR.

Figure 1:
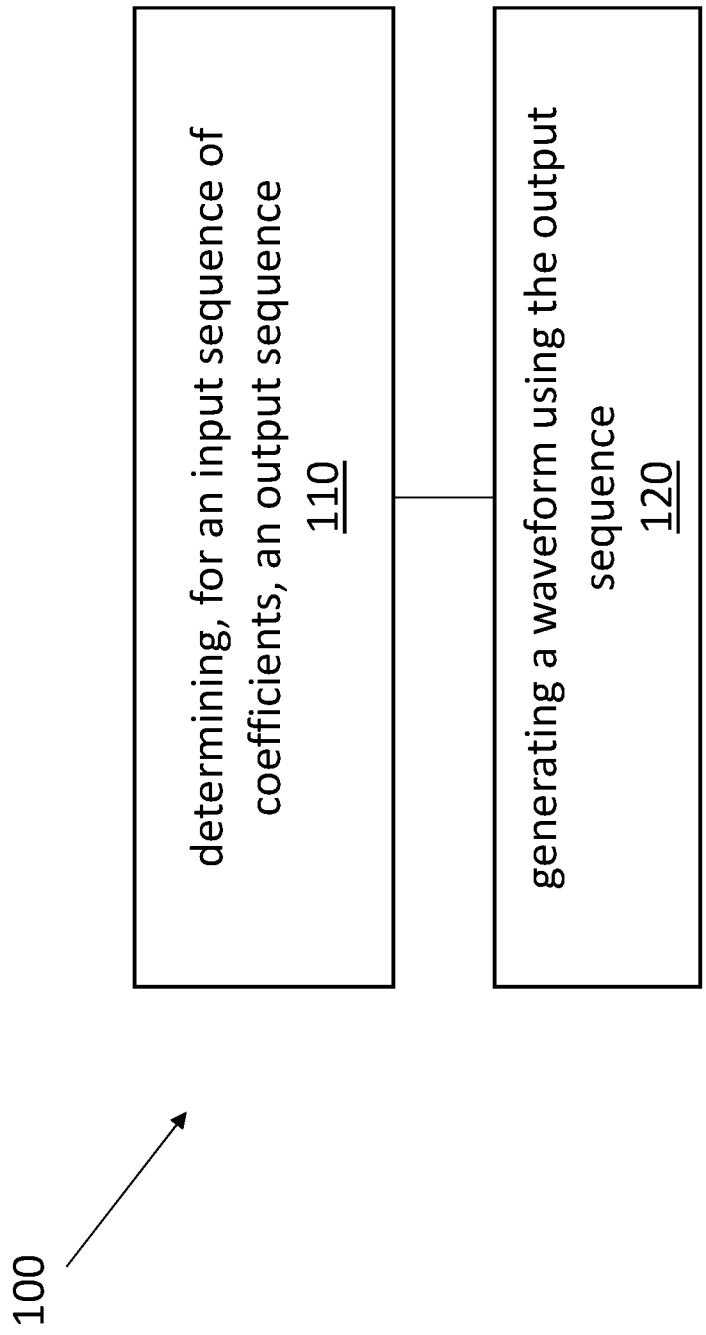
FIG. 1 is a flowchart representation of a wireless communication method in accordance with the present technology.

FIG. 1 is a flowchart representation of a wireless communication method 100 in accordance with the present technology. The method 100 may be implemented by a radio station such as a base station or a wireless device as described in the present document. For example, a processor in the radio station (e.g., processor electronics described in the present document) may be configured to implement the method 100. The method 100 includes, at operation 110, determining, for an input sequence, an output sequence. The output sequence corresponds to an output of a convolutional modulation between a set of coefficients and an intermediate sequence. The intermediate sequence is generated by inserting N zero coefficients between coefficients of the input sequence. The set of coefficients can include zero coefficients and non-zero coefficients. The number of non-zero coefficients in the set of coefficients is based on N, N being a positive integer. Values of the non-zero coefficients correspond to values between 0 to $\pi/2$ to reduce a peak to average power ratio of the output sequence. The method 100 also includes, at operation 120, generating a waveform using the output sequence.

In some embodiments, the above described methods may preferably further include one or more of the following features. In some embodiments, the number of the non-zero coefficients is 2N+1. In some embodiments, the non-zero coefficients are represented as [f(0), f(1), . . . , f(2N)]=p·[g(0), g(1), . . . , g(2N)], p being a scalar value. In some embodiments, the number of the non-zero coefficients is to 2N+2. In some embodiments, the non-zero coefficients are represented as a convolution, for example: [f(0), f(1), . . . , f(2N+1)]=p·[g(0), g(1), . . . , g(2N)]⊗[h(0), h(1)]. p is a scalar value. In some embodiments, [h(0), h(1)]=[1, 1]. In some embodiments, g(0)=g(2N), g(1)=g(2N−1), . . . , and g(N−1)=g(N+1), and g(0), g(1), . . . , and g(N) correspond to values that are between 0 to $\pi/2$. In some embodiments, g(i)=cos($\theta_i$), 0≤i≤N, and 0≤$\theta_i$<$\pi/2$. In some embodiments, p comprises a normalization parameter. The value of p can be 1. The value of p can also be based on N. For example, $$p = \frac{1}{2\cos\left(\frac{\pi}{8}\right)}$$

when N=1 or $$p = \frac{1}{2\cos\left(\frac{\pi}{12}\right)}$$

when N=2. In some embodiments, p is the same for all elements. In some embodiments, p may vary for different elements in the sequence.

In some embodiments, the modulation operation comprises a multi-path delay operation. In some embodiments, the multi-path delay operation includes a circular delay in which elements in the intermediate sequence are shifted in time domain in a circular manner or a linear delay in which elements in the intermediate sequence are shifted in time domain in a linear manner.

In some embodiments, the multi-path delay operation comprises generating multiple delayed paths based on the intermediate sequence using different delay values and computing a weighted sum of the multiple delayed paths using the set of non-zero coefficients. The advantage of inserting zero coefficients between coefficients of the input sequence is that data with a path difference of two steps is not affected by the weighted sum of the multiple paths. For example, given three paths $D^{-1}$, $D^0$, and $D^{-1}$, data in path $D^0$ does not impact data in path $D^{-1}$ and $D^1$. Assume that the coefficient for path $D^{-1}$ is d(−1), the coefficient for path $D^0$ is d(0) and the coefficient for path $D^1$ is d(1). In some embodiments, d(0)=1 so that there is no impact on data for path $D^0$. In some embodiments, $$d(-1) = d(1) = \frac{\sqrt{2}}{2}$$

so that, after the multipath delay operation, the phase obtained by superimposing $D^{-1}$ and $D^1$ is between the phases of two adjacent elements, thereby reducing PAPR.

In some embodiments, the operation of convolutional modulation is also referred to as a filtering operation by a filter module. The parameters of the filtering operation correspond to the non-zero coefficients f(n).

In some embodiments, the input sequence is determined by mapping data bits to constellation points according to a modulation scheme. In some embodiments, the modulation scheme includes $\pi/2$-Binary Phase Shift Keying(BPSK). Using $\pi/2$-BPSK as the modulation schemes gives the advantage that the phase between each adjacent two elements in the data sequence is $\pi/2$. In some embodiments, after the multi-path delay operation, the phase after superpositioning data paths has a difference 0 or $\pi/4$ (e.g., for N=1), or alternatively 0 or $\pi/6$ (e.g., for N=2) with adjacent elements, thereby reducing the peak-to-average ratio (PAPR) of the resulting data sequence.

In some embodiments, the input sequence includes a data sequence or a reference sequence. In some embodiments, the input sequence comprises one or more zero elements. In some embodiments, the zero coefficients are inserted before or after each coefficient of the input sequence. In some embodiments, the input sequence is a part of a data sequence which is transmitted by a wireless device.

Figure 2:
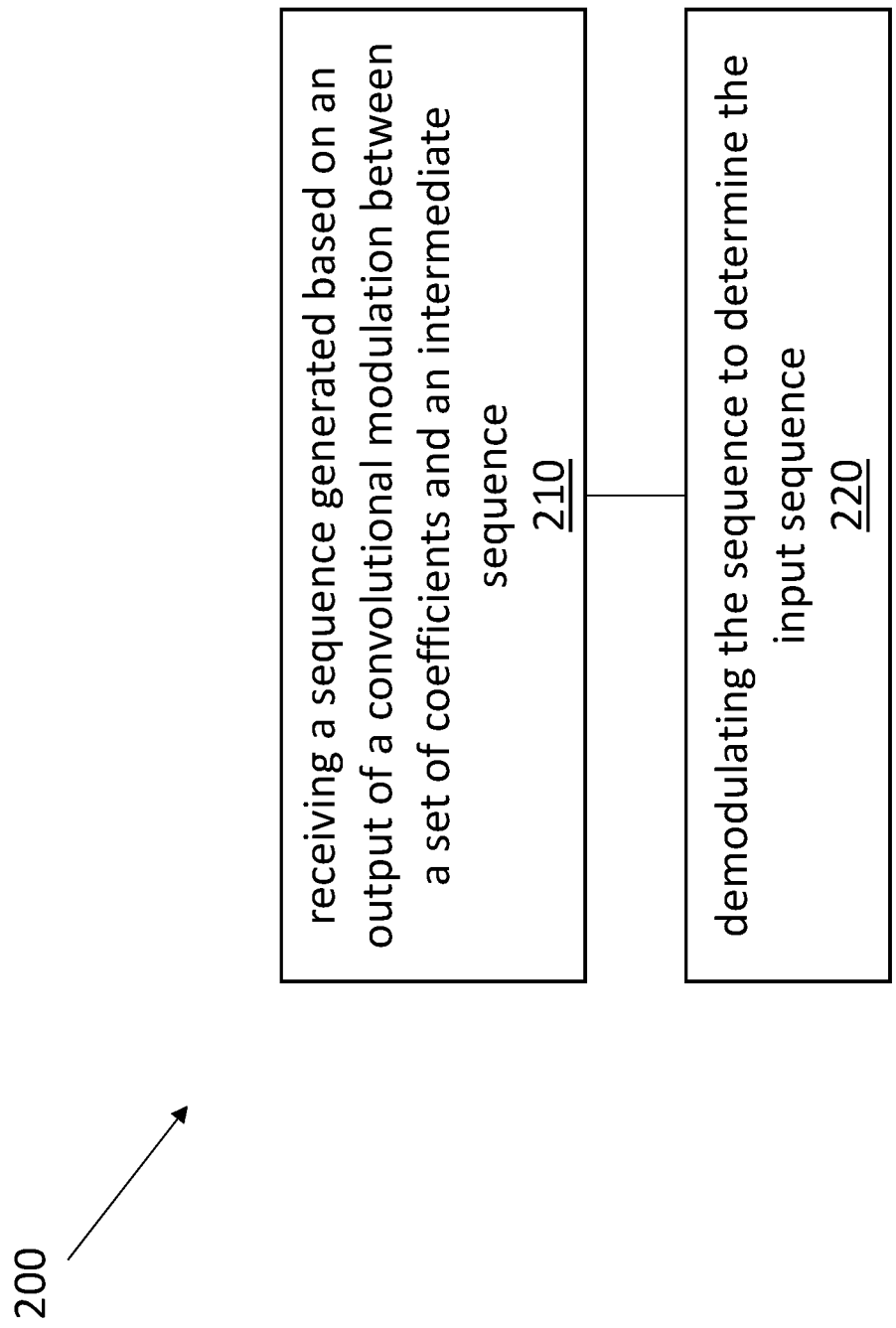
FIG. 2 is a flowchart representation of another wireless communication method in accordance with the present technology.

FIG. 2 is a flowchart representation of another wireless communication method 200 in accordance with the present technology. The method 200 includes, at operation 210, receiving a sequence generated based on an output of a convolutional modulation between a set of coefficients and an intermediate sequence. The intermediate sequence is generated by inserting N zero coefficients between coefficients of an input sequence. The set of coefficients can include zero coefficients and non-zero coefficients. The number of non-zero coefficients in the set of coefficients is based on N, N being a positive integer. Values of the non-zero coefficients correspond to values between 0 to $\pi/2$ to reduce a peak to average power ratio of the sequence. The method 200 also includes, at operation 220, demodulating the sequence to determine the input sequence In some embodiments, the above described methods may preferably further include one or more of the following features. In some embodiments, the number of the non-zero coefficients is 2N+1. In some embodiments, the non-zero coefficients are represented as [f(0), f(1), . . . , f(2N)]=p·[g(0), g(1), . . . , g(2N)], p being a scalar value. In some embodiments, the number of non-zero coefficients is to 2N+2. In some embodiments, the non-zero coefficients are represented as a convolution, e.g., [f(0), f(1), . . . , f(2N+1)]=p·[g(0), g(1), . . . , g(2N)]⊗[h(0), h(1)], p being a scalar value. In some embodiments, [h(0), h(1)]=[1, 1]. In some embodiments, g(0)=g(2N), g(1)=g(2N−1), . . . , and g(N−1)=g(N+1), and g(0), g(1), . . . , and g(N) correspond to values that are between 0 to $\pi/2$. In some embodiments, g(i)=cos($\theta_i$), 0≤i≤N, and 0≤$\theta_i$<$\pi/2$. In some embodiments, p comprises a normalization parameter. The value of p can be 1. The value of p can also be based on N. For example, $$p = \frac{1}{2\cos\left(\frac{\pi}{8}\right)}$$

when N=1 or $$p = \frac{1}{2\cos\left(\frac{\pi}{12}\right)}$$

when N=2. In some embodiments, p is the same for all elements. In some embodiments, p may vary for different elements in the sequence.

In some embodiments, the modulation operation comprises a multi-path delay operation. In some embodiments, the multi-path delay operation includes a circular delay in which elements in the intermediate sequence are shifted in time domain in a circular manner or a linear delay in which elements in the intermediate sequence are shifted in time domain in a linear manner.

In some embodiments, the input sequence includes a data sequence or a reference sequence. In some embodiments, the input sequence comprises one or more zero elements. In some embodiments, demodulating the sequence comprises combining, using the set of non-zero coefficients, adjacent elements of the sequence to determine a corresponding element in the input sequence.

In some embodiments, the input sequence of coefficients is determined by mapping data bits to constellation points according to a modulation scheme. The modulation scheme includes π/2-Binary Phase Shift Keying(BPSK). Using π/2-BPSK as the modulation schemes gives the advantage that the phase between each adjacent two elements in the data sequence is π/2. In some embodiments, after the multi-path delay operation, the phase after super-positioning data paths has a difference 0 or π/4 (e.g., for N=1), or alternatively 0 or π/6 (e.g., for N=2) with adjacent elements, thereby reducing the peak-to-average ratio (PAPR) of the resulting data sequence. In some embodiments, the method also includes determining corresponding mapped constellation points from the input sequence according to a modulation scheme and determining data bits based on the mapped constellation points.

When the modulation scheme of π/2-BPSK is combined with the path coefficients, after superimposing data of paths (e.g., D−1 and D1), the resulting modulus value is equal to the modulus of path D0. Thus, the modulus values of all the element data of the data sequence [s(k)] are equal, and the phase difference between adjacent elements is relatively small, thereby reducing the PAPR of the data sequence [s(k)]. Moreover, after receiving the data that includes the data sequence [s(k)], the receiving end obtains the data including the data sequence [x(i)] by using a correlation detection algorithm such as maximum ratio combining, which reduces processing complexity at the receiving side. The data sequence [x(i)] does not cause error propagation between data elements during demodulation. In addition, although the length of [s(k)] is doubled the length of [x(i)], which requires more physical resources, the improvement of signal-to-noise ratio (SNR) (e.g., experiments have shown that SNR can be improved by more than 3 dB) can compensate for the loss of transmission efficiency.

As further described in the present document, the above-described methods provide a flexible scheme to manipulate the input data sequence for achieving low PAPR. For example, the path delay operation and the coefficients can be variable based on the input data sequences (that is, the value of N can be variable). The moduli of all elements of the resulting sequence are the same. In particular, the moduli are equal to 1 when they are normalized by parameter p, which reduce the PAPR. The disclosed techniques also impose low complexity on the transmitting and/or receiving ends. Some examples of the disclosed techniques are described in the following example embodiments.

Embodiment 1

The input data sequence is $[x(i)]=[x(1), x(2), \ldots, x(I)]$. Zero coefficients are inserted after each element to form a second data sequence $[y(j)]=[x(1), 0, x(2), 0, \ldots, x(I), 0]$. Accordingly, $y(1)=x(1)$, $y(2)=0$, $y(3)=x(2)$, $y(4)=0, \ldots$, and $J=2I$. Then, the second data sequence $[y(j)]$ undergoes a multipath delay operation, according to non-zero coefficients $$p\left(\cos\frac{\pi}{3}, \cos\frac{\pi}{6}, 1, \cos\frac{\pi}{6}, \cos\frac{\pi}{3}\right),$$

to have a delay length of $$p\left(\cos\frac{\pi}{3}D^{-2}, \cos\frac{\pi}{6}D^{-1}, D^0, \cos\frac{\pi}{6}D^1, \cos\frac{\pi}{3}D^2\right).$$

The non-zero coefficients can be in a set of coefficients that includes both zero coefficients and non-zero coefficients.

In this embodiment, the multipath delay operation is a multipath cyclic delay operation that includes the following steps:

(1) In a first path, the data sequence [y(j)] undergoes a cyclic delay with a delay value of −2. The resulting data sequence is: $P/2\times[x(2), 0, \ldots, x(I), 0, x(1), 0]$. Note that elements [x(1), 0] are shifted to the end of the sequence due the cyclic or circular nature of the delay operation.

(2) In a second path, the data sequence [y(j)] undergoes a cyclic delay with a delay value of −1. The resulting data sequence is:

$$\frac{\sqrt{3}}{2}P\times[0, x(2), 0, \ldots, x(I), 0, x(1)].$$

Note that element x(1) is shifted to the end of the sequence due the cyclic or circular nature of the delay operation.

(3) In a third path, the data sequence [y(j)] undergoes a cyclic delay with a delay value of 0. Because the delay value is 0, the data sequence of this path remains as [y(j)]. The resulting data sequence is: $p\times[x(1), 0, x(2), 0, \ldots, x(I), 0]$.

(4) In a fourth path, the data sequence [y(j)] undergoes a cyclic delay with a delay value of 1. The resulting data sequence is:

$$\frac{\sqrt{3}}{2}p\times[0, x(1), 0, x(2), 0, \ldots, x(I)].$$

(5) In a fifth path, the data sequence [y(j)] undergoes a cyclic delay with a delay value of 2. Note that element x(I) is shifted to the beginning of the sequence due the cyclic or circular nature of the delay operation. The resulting data sequence is $P/2\times[x(I), 0, x(1), 0, x(2), 0, \ldots, x(I-1), 0]$.

After adding the data sequences obtained by the five paths, the data sequence [s(k)] is obtained as follows:

$$[s(k)] = P\left[x(1) + \frac{1}{2}x(2) + \frac{1}{2}x(I), \frac{\sqrt{3}}{2}(x(1) + x(2)), \ldots, \frac{\sqrt{3}}{2}(x(1) + x(I))\right],$$
$$K = J = 2I.$$

The phase difference between adjacent elements of s(k) can be π/6 (e.g., when N=2). The phase difference can also be smaller than π/6 for N>2. In some embodiments, p comprises a normalization parameter. The value of p can be 1. The value of p can also be based on N. For example, when N=2. In some embodiments, p is the same for all elements. In some embodiments, p may vary for different elements in the sequence.

The data sequence [s(k)] is carried on the physical time-frequency resource for transmission. When transmitting on physical time-frequency resources, it is also possible to discard some of the s(K) elements in order to save resources.

Embodiment 2

The input data sequence is [x(i)]=[x(1), x(2), ..., x(I)]. Zero coefficients are inserted after each element to form a second data sequence [y(j)]=[x(1), 0, x(2), 0, ..., x(I), 0]. Accordingly, y(1)=x(1), y(2)=0, y(3)=x(2), y(4)=0, ..., and J=2I. Then, the second data sequence [y(j)] undergoes a multipath delay operation, according to non-zero coefficients $$p\left(\cos\frac{\pi}{3}, \cos\frac{\pi}{6}, 1, \cos\frac{\pi}{6}, \cos\frac{\pi}{3}\right),$$

to have a delay length of $$p\left(\cos\frac{\pi}{3}D^{-2}, \cos\frac{\pi}{6}D^{-1}, D^0, \cos\frac{\pi}{6}D^1, \cos\frac{\pi}{3}D^2\right).$$

The non-zero coefficients can be in a set of coefficients that includes both zero coefficients and non-zero coefficients.

In this embodiment, the multipath delay operation is a multipath linear delay operation that includes the following steps:

(1) In a first path, the data sequence [y(j)] undergoes a linear delay with a delay value of −2. The resulting data sequence is: P/2×[x(1), 0, x(2), 0, ..., x(I), 0]. Note that first element x(1) is shifted linearly to time-domain position t=−2 due the linear nature of the delay operation.

(2) In a second path, the data sequence [y(j)] undergoes a linear delay with a delay value of −1. The resulting data sequence is:

$$\frac{\sqrt{3}}{2}P \times [0, x(1), 0, x(2), 0, \ldots, x(I), 0].$$

Note that first element x(1) is shifted linearly to time-domain position t=−1 due the linear nature of the delay operation and a leading zero is added to the sequence so that the sequence can align with the first sequence starting from time-domain position t=−2.

(3) In a third path, the data sequence [y(j)] undergoes a linear delay with a delay value of 0. Because the delay value is 0, the data sequence of this path remains as [y(j)]. The resulting data sequence is p×[0, 0, x(1), 0, x(2), 0, ..., x(I), 0]. Note that two leading zeros are added to the sequence so that the sequence can align with the first sequence starting from time-domain position t=−2.

(4) In a fourth path, the data sequence [y(j)] undergoes a linear delay with a delay value of 1. The resulting data sequence is:

$$\frac{\sqrt{3}}{2}p \times [0, 0, 0, x(1), 0, x(2), 0, \ldots, x(I), 0].$$

Note that although the fourth path undergoes only a delay value of 1, three leading zeros are added to the sequence so that the sequence can align with the other sequences starting from time-domain position t=−2.

(5) In a fifth path, the data sequence [y(j)] undergoes a linear delay with a delay value of 2. The resulting data sequence is p/2×[0, 0, 0, 0, x(1), 0, x(2), 0, ..., x(I), 0]. Four leading zeros are added to the sequence so that the sequence can align with the other sequences starting from time-domain position t=−2.

After adding the data sequences obtained by the five paths in (1), (2), (3), (4), and (5), the data sequence [s(k)] is obtained as follows:

$$[s(k)] = p\left[\frac{1}{2}x(1), \frac{\sqrt{3}}{2}x(1), \frac{1}{2}x(2), \ldots, \frac{1}{2}x(I), 0\right], K > J = 2I.$$

The phase difference between adjacent elements of s(k) can be π/6 (e.g., when N=2). The phase difference can also be smaller than π/6 for N>2.

In some embodiments, p comprises a normalization parameter. The value of p can be 1. The value of p can also be based on N. For example, $$p = \frac{1}{2\cos\left(\frac{\pi}{12}\right)}$$

when N=2. In some embodiments, p is the same for all elements. In some embodiments, p may vary for different elements in the sequence.

The data sequence [s(k)] is carried on the physical time-frequency resource for transmission. When transmitting on the physical time-frequency resource, the first data element s(1) is superimposed and transmitted with the previous data block, and the last data element s(K) is superimposed and transmitted with the latter data block.

Embodiment 3

The input data sequence is [x(i)]=[x(1), x(2), ..., x(I)]. Zero coefficients are inserted after each element to form a second data sequence [y(j)]=[x(1), 0, x(2), 0, ..., x(I), 0]. Accordingly, y(1)=x(1), y(2)=0, y(3)=x(2), y(4)=0, ..., and J=2I. Then, the second data sequence [y(j)] undergoes a multipath delay operation, according to non-zero coefficients $$p\left(\cos\frac{\pi}{4}, 1, \cos\frac{\pi}{4}\right) \otimes [1, 1],$$

to have $$p\left(\cos\frac{\pi}{4}D^{-1} + \left(1 + \cos\frac{\pi}{4}\right)D^0 + \left(1 + \cos\frac{\pi}{4}\right)D^1 + \cos\frac{\pi}{4}D^2\right).$$

The non-zero coefficients can be in a set of coefficients that includes both zero coefficients and non-zero coefficients. Different delay lengths can also be assigned to different coefficients, such as $$p\left(\cos\frac{\pi}{4}D^{-2}, \left(1 + \cos\frac{\pi}{4}\right)D^{-1} + \left(1 + \cos\frac{\pi}{4}\right)D^0 + \cos\frac{\pi}{4}D^1\right) \text{ or}$$

$$p\left(\cos\frac{\pi}{4}D^0, \left(1 + \cos\frac{\pi}{4}\right)D^1 + \left(1 + \cos\frac{\pi}{4}\right)D^2 + \cos\frac{\pi}{4}D^3\right).$$

In this embodiment, the multipath delay operation is a multipath cyclic delay operation that includes the following steps:

(1) In a first path, the data sequence [y(j)] undergoes a cyclic delay with a delay value of −1. The resulting data sequence is:

$$[0, x(2), 0, \ldots, x(I), 0, x(1)] \times P\frac{\sqrt{2}}{2}.$$

Note that element x(1) is shifted to the end of the sequence due the cyclic or circular nature of the delay operation.

(2) In a second path, the data sequence [y(j)] undergoes a cyclic delay with a delay value of 0. Because the delay value is 0, the data sequence of this path remains as [y(j)]. The resulting data sequence is:

$$[x(1), 0, x(2), 0, \ldots, x(I), 0] \times P\left(1 + \frac{\sqrt{2}}{2}\right).$$

(3) In a third path, the data sequence [y(j)] undergoes a cyclic delay with a delay value of 1. The resulting data sequence is:

$$[0, x(1), 0, x(2), 0, \ldots, x(I)] \times P\left(1 + \frac{\sqrt{2}}{2}\right).$$

(4) In a fourth path, the data sequence [y(j)] undergoes a cyclic delay with a delay value of 2. Note that element x(I) is shifted to the beginning of the sequence due the cyclic or circular nature of the delay operation. The resulting data sequence is $$[x(I), 0, x(1), 0, x(2), 0, \ldots, x(I-1), 0] \times P\frac{\sqrt{2}}{2}.$$

After adding the data sequences obtained by the four paths in (1), (2), (3), and (4) the data sequence [s(k)] is obtained as follows:

$$[s(k)] = P\left[\left(1 + \frac{\sqrt{2}}{2}\right)x(1) + \frac{\sqrt{2}}{2}x(I),\right.$$
$$\left.\left(1 + \frac{\sqrt{2}}{2}\right)x(1) + \frac{\sqrt{2}}{2}x(2), \ldots, x(I), \frac{\sqrt{2}}{2}x(1) + \left(1 + \frac{\sqrt{2}}{2}\right)x(I)\right]$$

Therefore, $$s(0) = P\left(\left(1 + \frac{\sqrt{2}}{2}\right)x(1) + \frac{\sqrt{2}}{2}x(I)\right),$$

$$s(1) = P\left(\left(1 + \frac{\sqrt{2}}{2}\right)x(1) + \frac{\sqrt{2}}{2}x(2)\right), \ldots,$$

$$s(K) = P\left(\frac{\sqrt{2}}{2}x(1) + \left(1 + \frac{\sqrt{2}}{2}\right)x(I)\right)$$

and K=J=2I.

In some embodiments, the phase difference between adjacent elements of s(k) is 0 or 4/π (e.g., when N=1). In some embodiments, the phase difference between adjacent elements of s(k) is 0 or π/6 (e.g., when N=2). The phase difference can also be smaller than π/6 for N>2.

In some embodiments, p comprises a normalization parameter. The value of p can be 1. The value of p can also be based on N. For example, $$p = \frac{1}{2\cos\left(\frac{\pi}{8}\right)}$$

when N=1 or $$p = \frac{1}{2\cos\left(\frac{\pi}{12}\right)}$$

when N=2. In some embodiments, p is the same for all elements. In some embodiments, p may vary for different elements in the sequence.

The data sequence [s(k)] is carried on the physical time-frequency resource for transmission. When transmitting on physical time-frequency resources, it is also possible to discard some of the s(K) elements in order to save resources.

Embodiment 4

The input data sequence is [x(i)]=[x(1), x(2), . . . , x(I)]. Zero coefficients are inserted after each element to form a second data sequence [y(j)]=[x(1), 0, x(2), 0, . . . , x(I), 0]. Accordingly, y(1)=x(1), y(2)=0, y(3)=x(2), y(4)=0, . . . , and J=2I. Then, the second data sequence [y(j)] undergoes a multipath delay operation, according to non-zero coefficients $$p\left(\cos\frac{\pi}{4}, 1, \cos\frac{\pi}{4}\right) \otimes [1, 1],$$

to have a delay length of $$p\left(\cos\frac{\pi}{4}D^{-1}, \left(1 + \cos\frac{\pi}{4}\right)D^0 + \left(1 + \cos\frac{\pi}{4}\right)D^1 + \cos\frac{\pi}{4}D^2\right).$$

The non-zero coefficients can be in a set of coefficients that includes both zero coefficients and non-zero coefficients. Different delay lengths can also be assigned to different coefficients, such as $$p\left(\cos\frac{\pi}{4}D^{-2}, \left(1+\cos\frac{\pi}{4}\right)D^{-1} + \left(1+\cos\frac{\pi}{4}\right)D^{0} + \cos\frac{\pi}{4}D^{1}\right)$$

or $$p\left(\cos\frac{\pi}{4}D^{0}, \left(1+\cos\frac{\pi}{4}\right)D^{1} + \left(1+\cos\frac{\pi}{4}\right)D^{2} + \cos\frac{\pi}{4}D^{3}\right).$$

In this embodiment, the multipath delay operation is a multipath linear delay operation that includes the following steps:

(1) In a first path, the data sequence [y(j)] undergoes a linear delay with a delay value of −1. The resulting data sequence is:

$$[x(1), 0, x(2), 0, \ldots, x(I), 0] \times P\frac{\sqrt{2}}{2}.$$

Note that first element x(1) is shifted linearly to time-domain position t=−1 due the linear nature of the delay operation.

(2) In a second path, the data sequence [y(j)] undergoes a linear delay with a delay value of 0. Because the delay value is 0, the data sequence of this path remains as [y(j)]. The resulting data sequence is:

$$[0, x(1), 0, x(2), 0, \ldots, x(I), 0] \times P\left(1 + \frac{\sqrt{2}}{2}\right).$$

Note that a leading zero is added to the sequence so that the second sequence can align with the first sequence starting from time-domain position t=−1.

(3) In a third path, the data sequence [y(j)] undergoes a linear delay with a delay value of 1. The resulting data sequence is:

$$[0, 0, x(1), 0, x(2), 0, \ldots, x(I), 0] \times P\left(1 + \frac{\sqrt{2}}{2}\right).$$

Note that although the third path undergoes only a delay value of 1, two leading zeros are added to the sequence so that the third sequence can align with the other two sequences starting from time-domain position t=−1.

(4) In a fourth path, the data sequence [y(j)] undergoes a linear delay with a delay value of 2. The resulting data sequence is $$[0, 0, 0, x(1), 0, x(2), 0, \ldots, x(I), 0]$$

$$P\frac{\sqrt{2}}{2}.$$

After adding the data sequences obtained by the four paths in (1), (2), (3), and (4) the data sequence [s(k)] is obtained as follows:

$$[s(k)] = P\left[\frac{\sqrt{2}}{2}x(1), \left(1+\frac{\sqrt{2}}{2}\right)x(1),\right.$$
$$\left.\frac{\sqrt{2}}{2}x(2) + \left(1+\frac{\sqrt{2}}{2}\right)x(1), \ldots, \left(1+\frac{\sqrt{2}}{2}\right)x(I), \frac{\sqrt{2}}{2}x(I), 0\right]$$

Therefore, $$s(1) = P\frac{\sqrt{2}}{2}x(1),$$

$$s(2) = P\left(1 + \frac{\sqrt{2}}{2}\right)x(1),$$

$$s(3) = P\left(\frac{\sqrt{2}}{2}x(2) + \left(1 + \frac{\sqrt{2}}{2}\right)x(1)\right), \ldots,$$

$$s(K-1) = \frac{\sqrt{2}}{2}x(I),$$

S(K)=0 and K>J=2I.

In some embodiments, the phase difference between adjacent elements of s(k) is 0 or 4/π (e.g., when N=1). In some embodiments, the phase difference between adjacent elements of s(k) is 0 or π/6 (e.g., when N=2). The phase difference can also be smaller than π/6 for N>2.

In some embodiments, p comprises a normalization parameter. The value of p can be 1. The value of p can also be based on N. For example, $$p = \frac{1}{2\cos\left(\frac{\pi}{8}\right)}$$

when N=1 or $$p = \frac{1}{2\cos\left(\frac{\pi}{12}\right)}$$

when N=2. In some embodiments, p is the same for all elements. In some embodiments, p may vary for different elements in the sequence.

The data sequence [s(k)] is carried on the physical time-frequency resource for transmission. When transmitting on the physical time-frequency resource, the first data element s(1) is superimposed and transmitted with the previous data block, and the last data element s(K) is superimposed and transmitted with the latter data block.

Embodiment 5

Figure 3:
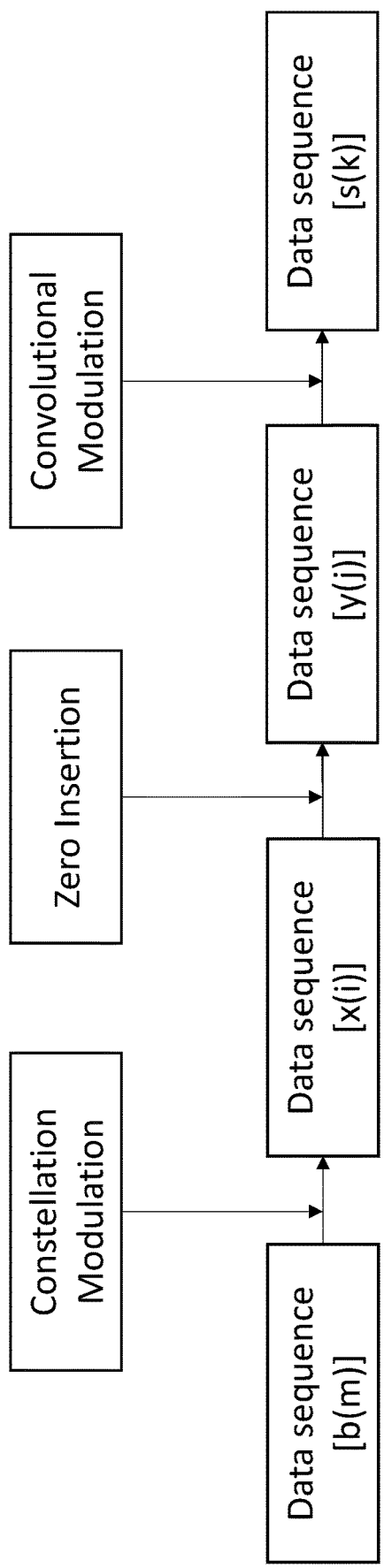
FIG. 3 illustrates example sequence of operations in accordance with the present technology.

FIG. 3 illustrates example sequence of operations in accordance with the present technology. The user data sequence [b(m)] to be transmitted is first modulated by constellation points to generate a data sequence [x(i)]. The constellation modulation includes π/2-BPSK, π/4-QPSK, QPSK, 16QAM, and/or APSK. Zero coefficients are then inserted into the data sequence [x(i)] to generate data sequence [y(j)]. The zero coefficients can be inserted before or after each element of the data sequence [x(i)]. The resulting data sequence [y(j)] is then convolutionally modulated to generate a data sequence [s(k)] based on a set of coefficients. The convolution modulation includes a circular convolution, a linear convolution, a cyclic delay operation, or a linear delay operation. The set of coefficients includes non-zero coefficients that are derived according to the embodiments described above. For example, the non-zero coefficients can be $$\left(\cos\frac{\pi}{4}, 1, \cos\frac{\pi}{4}\right),$$
$$\left(\cos\frac{\pi}{4}, \left(1+\cos\frac{\pi}{4}\right), \left(1+\cos\frac{\pi}{4}\right), \cos\frac{\pi}{4}\right)$$
or
$$\left(\cos\frac{\pi}{3}, \cos\frac{\pi}{6}, 1, \cos\frac{\pi}{6}, \cos\frac{\pi}{3}\right).$$

Embodiment 6

When the convolution modulation in FIG. 3 is circular convolution modulation, the cyclic convolution modulation includes a circular convolution of the data sequence [y(j)] and data sequence f(n). Different cyclic shifts of the data sequence f(n) can be implemented to achieve different multipath delay lengths. Other details of the convolution modulation are similar as described in the embodiments above.

In some embodiments, other operations can be performed before the data sequence [s(k)] is carried on a physical time-frequency resource for transmission, such as adding a reference sequence in the data sequence [s(k)], adding a reference sequence before or after the data sequence [s(k)], performing Fast Fourier Transform (FFT), performing frequency shaping, performing Inverse FFT (IFFT), and/or filtering of the data sequence [s(k)].

Figure 4:
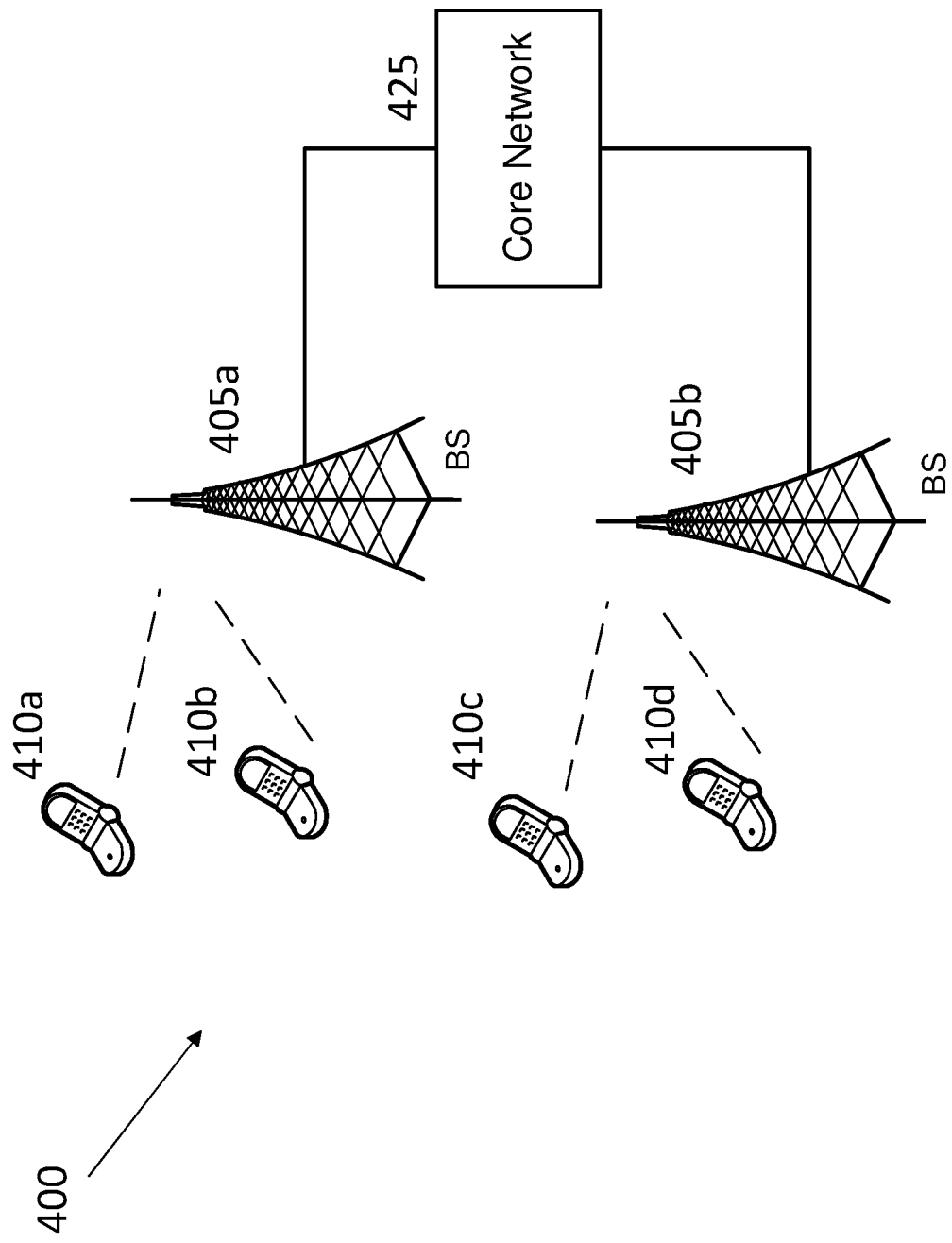
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies. The techniques and embodiments described in the present document may be implemented by the base stations of wireless devices described in the present document.

Figure 5:
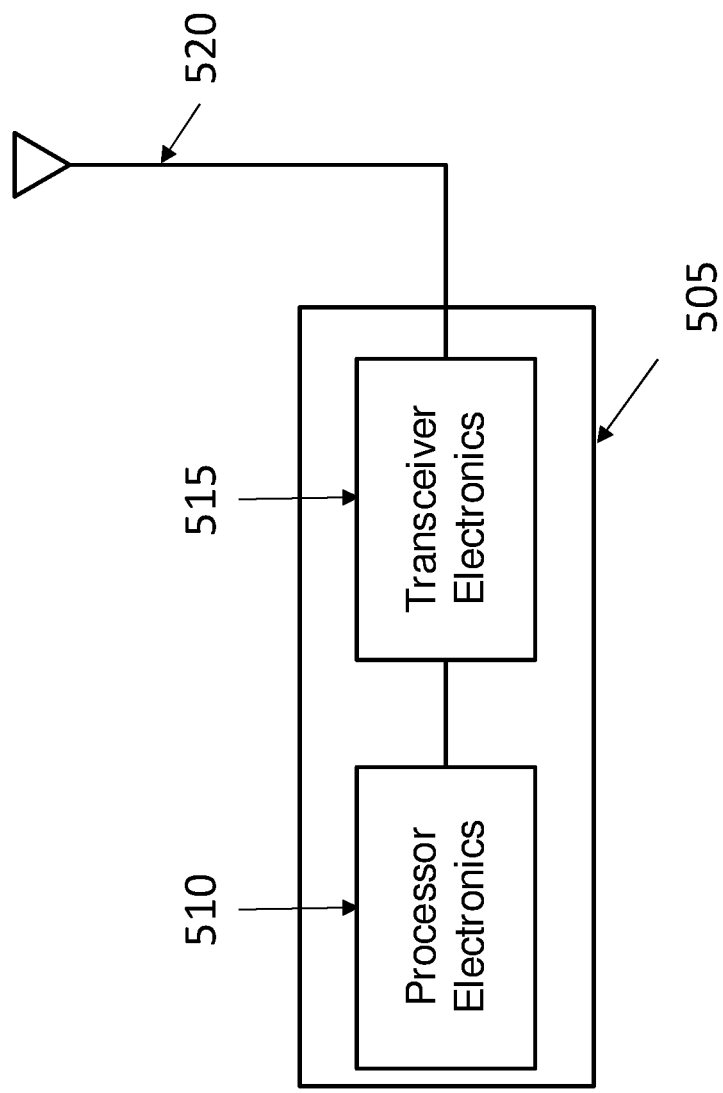
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It will be appreciated that the present document discloses techniques that can be embodied in various embodiments to efficiently reduce PAPR in signal transmission, thereby meeting the low PAPR requirements of various wireless communication applications. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   determining, for an input sequence, an output sequence, wherein the output sequence corresponds to an output of a convolutional modulation between a set of coefficients and an intermediate sequence, wherein the intermediate sequence is generated by inserting N zero coefficients into the input sequence, wherein the set of coefficients includes non-zero coefficients that are represented as $[f(0), f(1), \ldots, f(2N)]$ or $[f(0), f(1), \ldots, f(2N+1)]$, wherein a number of the non-zero coefficients in the set of coefficients is $2N+1$ or $2N+2$, N being a positive integer indicating a number of zero coefficients inserted into the input sequence to generate the intermediate sequence, wherein values of the non-zero coefficients are based on $\cos(\theta i)$, and wherein i is between 0 and N and $\theta i$ is between 0 to $\pi/2$ and a number of different values of $\cos(\theta i)$ for the set of coefficients is $N+1$; and generating a waveform using the output sequence.

2. The method of claim 1, wherein the number of the non-zero coefficients is:
   $2N+1$, in response to the non-zero coefficients represented as $[f(0), f(1), \ldots, f(2N)]$ being obtained by $p \cdot [g(0), g(1), \ldots, g(2N)]$, p being a scalar value; or
   $2N+2$, in response to the non-zero coefficients represented as $[f(0), f(1), \ldots, f(2N+1)]$ being a convolution of $p \cdot [g(0), g(1), \ldots, g(2N)]$ and $[1, 1]$, and
   wherein $g(0)=g(2N)$, $g(1)=g(2N-1)$, ... and $g(N-1)=g(N+1)$, wherein values of $g(0), g(1), \ldots, g(N)$ correspond to values between 0 to $\pi/2$, and wherein $g(i)=\cos(i)$, $0 \leq i \leq N$, and $0 \leq \theta i \leq \pi/2$.

3. The method of claim 1, wherein the convolutional modulation comprises a multi-path delay operation, and wherein the multi-path delay operation includes a circular delay in which coefficients in the intermediate sequence are shifted in time domain in a circular manner or a linear delay in which coefficients in the intermediate sequence are shifted in time domain in a linear manner.

4. The method of claim 1, wherein the convolutional modulation comprises a multi-path delay operation, and wherein the multi-path delay operation comprises:
   generating multiple delayed paths based on the intermediate sequence using different delay values; and
   computing a weighted sum of the multiple delayed paths using the non-zero coefficients.

5. The method of claim 1, wherein the input sequence is determined by mapping data bits to constellation points according to a modulation scheme.

6. A wireless communication method, comprising:
   receiving a sequence generated based on an output of a convolutional modulation between a set of coefficients and an intermediate sequence, wherein the intermediate sequence is generated by inserting N zero coefficients into an input sequence, wherein the set of coefficients includes non-zero coefficients that are represented as $[f(0), f(1), \ldots, f(2N)]$ or $[f(0), f(1), \ldots, f(2N+1)]$, wherein a number of the non-zero coefficients in the set of coefficients is $2N+1$ or $2N+2$, N being a positive integer indicating a number of zero coefficients inserted into the input sequence to generate the intermediate sequence, wherein values of the non-zero coefficients are based on $\cos(\theta i)$, and wherein i is between 0 and N and $\theta i$ is between 0 to $\pi/2$ and a number of different values of $\cos(\theta i)$ for the set of coefficients is $N+1$; and
   demodulating the received sequence to determine the input sequence.

7. The method of claim 6, wherein the number of the non-zero coefficients is:
   $2N+1$, in response to the non-zero coefficients represented as $[f(0), f(1), \ldots, f(2N)]$ being obtained by $p \cdot [g(0), g(1), \ldots, g(2N)]$, p being a scalar value; or
   $2N+2$, in response to the non-zero coefficients represented as $[f(0), f(1), \ldots, f(2N+1)]$ being a convolution of $p \cdot [g(0), g(1), \ldots, g(2N)]$ and $[1, 1]$, and
   wherein $g(0)=g(2N)$, $g(1)=g(2N-1)$, ..., and $g(N-1)=g(N+1)$, and wherein $g(0), g(1), \ldots,$ and $g(N)$ correspond to values that are between 0 to $\pi/2$, and wherein $g(i)=\cos(i)$, $0 \leq i \leq N$, and $0 \leq \theta i \leq \pi/2$.

8. The method of claim 6, wherein the convolutional modulation comprises a multi-path delay operation, and wherein the multi-path delay operation includes a circular delay in which elements in the intermediate sequence are shifted in time domain in a circular manner or a linear delay in which elements in the intermediate sequence are shifted in time domain in a linear manner.

9. The method of claim 6, further comprising:
determining corresponding mapped constellation points from the input sequence according to a modulation scheme; and
determining data bits based on the mapped constellation points.

10. The method of claim 6, wherein demodulating the received sequence comprises:
combining, using the non-zero coefficients, adjacent elements of the sequence to determine a corresponding element in the input sequence.

11. A wireless communication apparatus comprising a processor and a memory storing instructions, execution of which by the processor causes the apparatus to perform operations comprising:
determining, for an input sequence, an output sequence, wherein the output sequence corresponds to an output of a convolutional modulation between a set of coefficients and an intermediate sequence, wherein the intermediate sequence is generated by inserting N zero coefficients into the input sequence, wherein the set of coefficients includes non-zero coefficients that are represented as [f(0), f(1), ..., f(2N)] or [f(0), f(1), ..., f(2N+1)], wherein a number of the non-zero coefficients in the set of coefficients is 2N+1 or 2N+2, N being a positive integer indicating a number of zero coefficients inserted into the input sequence to generate the intermediate sequence, wherein values of the non-zero coefficients are based on cos ($\theta$i), and wherein i is between 0 and N and $\theta$i is between 0 to $\pi/2$ and a number of different values of cos ($\theta$i) for the set of coefficients is N+1; and
generating a waveform using the output sequence.

12. The apparatus of claim 11, wherein the number of the non-zero coefficients is:
2N+1, in response to the non-zero coefficients represented as [f(0), f(1), ..., f(2N)] being obtained by p·[g(0), g(1), ..., g(2N)], p being a scalar value; or
2N+2, in response to the non-zero coefficients represented as [f(0), f(1), ..., f(2N+1)] being a convolution of p·[g(0), g(1), ..., g(2N)] and [1, 1], and
wherein g(0)=g(2N), g(1)=g(2N−1), ..., and g(N−1)=g(N+1), wherein values of g(0), g(1), ... g(N) correspond to values between 0 to $\pi/2$, and wherein g(i)=cos (i), $0 \le i \le N$, and $0 \le \theta i \le \pi/2$.

13. The apparatus of claim 11, wherein the convolutional modulation comprises a multi-path delay operation, and wherein the multi-path delay operation includes a circular delay in which coefficients in the intermediate sequence are shifted in time domain in a circular manner or a linear delay in which coefficients in the intermediate sequence are shifted in time domain in a linear manner.

14. The apparatus of claim 11, wherein the convolutional modulation comprises a multi-path delay operation, and wherein the multi-path delay operation comprises:
generating multiple delayed paths based on the intermediate sequence using different delay values; and
computing a weighted sum of the multiple delayed paths using the non-zero coefficients.

15. A wireless communication apparatus comprising a processor and a memory storing instructions, execution of which by the processor causes the apparatus to perform operations comprising:
receiving a sequence generated based on an output of a convolutional modulation between a set of coefficients and an intermediate sequence, wherein the intermediate sequence is generated by inserting N zero coefficients into an input sequence, wherein the set of coefficients includes non-zero coefficients that are represented as [f(0), f(1), ..., f(2N)] or [f(0), f(1), ..., f(2N+1)], wherein a number of the non-zero coefficients in the set of coefficients is 2N+1 or 2N+2, N being a positive integer indicating a number of zero coefficients inserted into the input sequence to generate the intermediate sequence, wherein values of the non-zero coefficients are based on cos ($\theta$i), and wherein i is between 0 and N and $\theta$i is between 0 to $\pi/2$ and a number of different values of cos ($\theta$i) for the set of coefficients is N+1; and
demodulating the received sequence to determine the input sequence.

16. The apparatus of claim 15, wherein the number of the non-zero coefficients is:
2N+1, in response to the non-zero coefficients represented as [f(0), f(1), ..., f(2N)] being obtained by p·[g(0), g(1), ..., g(2N)], p being a scalar value; or
2N+2, in response to the non-zero coefficients represented as [f(0), f(1), ..., f(2N+1)] being a convolution of p·[g(0), g(1), ..., g(2N)] and [1, 1], and
wherein g(0)=g(2N), g(1)=g(2N−1), ... and g(N−1)=g(N+1), wherein values of g(0), g(1), ..., g(N) correspond to values between 0 to $\pi/2$, and wherein g(i)=cos (i), $0 \le i \le N$, and $0 \le \theta i \le \pi/2$.

17. The apparatus of claim 15, wherein the convolutional modulation comprises a multi-path delay operation, and wherein the multi-path delay operation includes a circular delay in which elements in the intermediate sequence are shifted in time domain in a circular manner or a linear delay in which elements in the intermediate sequence are shifted in time domain in a linear manner.

18. The apparatus of claim 15, wherein demodulating the received sequence comprises:
combining, using the non-zero coefficients, adjacent elements of the received sequence to determine a corresponding element in the input sequence.

* * * * *